United States Patent
Kondo et al.

(10) Patent No.: US 8,637,631 B2
(45) Date of Patent: Jan. 28, 2014

(54) POLYPHENYLENE ETHER AND METHOD FOR PRODUCING THE SAME

(75) Inventors: Tomohiro Kondo, Tokyo (JP); Akinobu Nagai, Tokyo (JP); Akira Mitsui, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/577,919

(22) PCT Filed: Feb. 24, 2011

(86) PCT No.: PCT/JP2011/054170
§ 371 (c)(1),
(2), (4) Date: Aug. 9, 2012

(87) PCT Pub. No.: WO2011/105504
PCT Pub. Date: Sep. 1, 2011

(65) Prior Publication Data
US 2012/0309925 A1    Dec. 6, 2012

(30) Foreign Application Priority Data

Feb. 24, 2010 (JP) ................. 2010-038861
Feb. 26, 2010 (JP) ................. 2010-043327

(51) Int. Cl.
*C08G 63/02* (2006.01)
(52) U.S. Cl.
USPC ........... 528/272; 528/184; 528/190; 528/192; 528/193; 528/271

(58) Field of Classification Search
USPC .................. 528/184, 190, 192, 193, 271, 272
See application file for complete search history.

(56) References Cited

U.S. PATENT DOCUMENTS

| 3,402,144 | A * | 9/1968 | Hay ............................. 525/390 |
| 5,214,128 | A | 5/1993 | Horiguchi et al. |
| 7,041,780 | B2 | 5/2006 | Buckley et al. |
| 7,244,813 | B2 | 7/2007 | Dong et al. |
| 2005/0049362 | A1 | 3/2005 | Buckley et al. |

FOREIGN PATENT DOCUMENTS

| JP | 47-42735 | 10/1972 |
| JP | 63-243129 | 10/1988 |
| JP | 4-25528 | 1/1992 |
| JP | 2003-002981 | 1/2003 |
| JP | 2004-083733 | 3/2004 |
| JP | 2004-099682 | 4/2004 |
| JP | 2006-526055 | 11/2006 |
| JP | 2010-241876 | 10/2010 |

OTHER PUBLICATIONS

Search report from International Application No. PCT/JP2011/054170, mail date is May 31, 2011.
International Preliminary Report on Patentability for International Application No. PCT/JP2011/054170, mail date is Sep. 18, 2012.

* cited by examiner

*Primary Examiner* — Terressa Boykin
(74) *Attorney, Agent, or Firm* — Greenblum & Bernstein, P.L.C.

(57) ABSTRACT

A polyphenylene ether which has a content of a metal magnetic material of 0.001 ppm or higher and lower than 1.000 ppm.

51 Claims, No Drawings

POLYPHENYLENE ETHER AND METHOD FOR PRODUCING THE SAME

TECHNICAL FIELD

The present invention relates to a polyphenylene ether, and a method for producing the same.

BACKGROUND ART

Polyphenylene ether is excellent in processability and productivity, and has an advantage of being capable of being efficiently made into products and parts having desired shapes by a molding method such as melt injection or melt extrusion. Polyphenylene ether, making the best use of such an advantage, is broadly used in the field of electric and electronic materials, the field of automobiles, other fields of various types of industrial materials, and the field of food packages, and as materials for parts. Particularly, since polyphenylene ether is excellent in electric characteristics, it is being developed to applications as electronic materials, particular applications requiring the insulation performance.

In the above-mentioned applications as electronic materials, the requirement for, in addition to electric characteristics, the appearance of products has been raised; therefore, the improvement of color tone of polyphenylene ether itself, and the reduction of contamination of molded products with foreign matters (gelled materials, by-products, metals and the like) are demanded.

As technologies to reduce foreign matters contained in polyphenylene ether, there are proposed, for example, a technology in which polyphenylene ether is melt kneaded and thereafter melt filtered (for example, see Patent document 1), and a technology in which the filtration is carried out in every step from the polymerization to the melt kneading (for example, see Patent document 2). There is also proposed a technology in which in order to suppress clogging of a hot runner with metal foreign matters in injection molding utilizing the hot runner, pellets used in injection molding are sorted using a magnetic sorting machine, and only pellets having little metal contamination are taken out (for example, see Patent document 3).

On the other hand, also in the field using polyphenylene ether, the size-reduction and precision enhancement of parts and the thickness reduction of molded products are progressing. In order to maintain the high insulation performance also in such molded products size-reduced, precision-enhanced and thickness-reduced, the electric characteristics of polyphenylene ether are required to be raised.

From the viewpoint of raising the dielectric breakdown resistance and the like out of electric characteristics, metal foreign matters contained in molded products are required to be more highly reduced. The technical development with respect to catalytic metal residues contained in polyphenylene ether has conventionally been made, and there is proposed, for example, a method of making metals in a polyphenylene ether to be 10 ppm or less (for example, see Patent document 4).

PRIOR ART DOCUMENTS

Patent Document

Patent document 1: U.S. Pat. No. 7,244,813
Patent document 2: U.S. Pat. No. 7,041,780
Patent document 3: Japanese Patent Laid-Open No. 2004-99682
Patent document 4: Japanese Patent Laid-Open No. 2003-2981

SUMMARY OF INVENTION

Problem to be Solved by the Invention

As described above, technologies to reduce the amount of foreign matters contained in polyphenylene ether have been conventionally proposed.

However, the technologies of Patent documents 1 and 2 relate to filtration of melt kneaded resin compositions, and pose a difficulty in secure decrease of contaminating metals due to damage and the like of a part of an apparatus in the melt kneading step.

The technology of Patent document 3 specifically relates to a technology of passing resin pellets through a magnetic sorting machine, and cannot sufficiently remove metal foreign matters for such reasons that the metals included in the pellet interior cannot sufficiently be removed, and that pellets once adsorbed by a magnet drop by their own weight and the collision of pellets passing afterward, and thus cannot completely be removed.

The technology of Patent document 4 relates to a method of decreasing metal catalyst (Cu or the like) residues in a polyphenylene ether, and is still insufficient as a technology to decrease a metal magnetic material (Fe) bringing about dielectric breakdown.

Any of the above-mentioned conventional technologies is a technology of primarily aiming at the decrease of foreign matters, and is not improved in color tone of the polyphenylene ether itself.

Although a technology is conventionally known in which in order to improve the color tone of polyphenylene ether, the polyphenylene ether, a thermostabilizer and the like are melt kneaded, the secure decrease of inevitably contaminating metals in the melt kneading step is difficult, as in Patent document 1 and the like.

Then, an object of the present invention is to provide a polyphenylene ether having a low foreign matter content, excelling in electric characteristics, and excelling also in the appearance characteristic.

Means for Solving the Problem

As a result of exhaustive studies to solve the above-mentioned problems, the present inventors have found that the specifying of the metal magnetic material amount in a polyphenylene ether in a predetermined range can solve the above-mentioned problems, and can provide the polyphenylene ether excellent in electric characteristics and excellent in the appearance characteristic; and this finding has led to the completion of the present invention.

That is, the present invention is as follows.
[1]
A polyphenylene ether, comprising a content of a metal magnetic material of 0.001 ppm or higher and lower than 1.000 ppm.
[2]
The polyphenylene ether according to item [1] above, wherein the polyphenylene ether comprises a content of a metal magnetic material of 0.001 ppm or higher and lower than 0.500 ppm.
[3]
The polyphenylene ether according to item [1] or [2] above, wherein the polyphenylene ether comprises a content of a metal magnetic material of 0.001 ppm or higher and lower than 0.100 ppm.

[4]
The polyphenylene ether according to any one of items [1] to [3] above, wherein the metal magnetic material is a metal magnetic material comprising an Fe element.

[5]
The polyphenylene ether according to item [4] above, wherein the polyphenylene ether comprises a content of the Fe element of 0.001 ppm or higher and lower than 0.100 ppm.

[6]
The polyphenylene ether according to any one of items [1] to [5] above, wherein the polyphenylene ether is a powder having a volume-average particle diameter of 3 mm or smaller.

[7]
The polyphenylene ether according to any one of items [1] to [6] above, wherein the polyphenylene ether is a powder having a loose apparent specific gravity of 0.4 or higher.

[8]
The polyphenylene ether according to any one of items [1] to [7] above, wherein the polyphenylene ether is a powder having a specific surface area of 1 m²/g or larger.

[9]
The polyphenylene ether according to any one of items [1] to [8] above, wherein a whole metal magnetic material comprises a content of the metal magnetic material having a maximum breadth of 150 μm or larger of 0.1 particle/kg or lower.

[10]
The polyphenylene ether according to any one of items [1] to [9], wherein the polyphenylene ether has a C. I. heat (a color index value of a polyphenylene ether compressed at 310° C. for 20 min at a pressure of 10 MPa) of 3.5 or lower.

[11]
A method for producing a polyphenylene ether, comprising the steps of:
polymerizing a phenol compound so as to obtain a polyphenylene ether represented by the following formula (1); and
passing the polyphenylene ether through a magnetic separating machine equipped with a magnetic force-generating source so as to make a content of a metal magnetic material in the polyphenylene ether to be 0.001 ppm or higher and lower than 1.000 ppm:

[Formula 1]

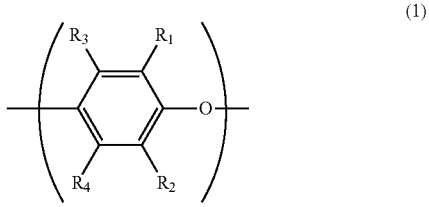

(1)

wherein $R_1$, $R_2$, $R_3$ and $R_4$ each independently represents one selected from the group consisting of a hydrogen atom, a halogen atom, an alkyl group which may be substituted, an aryl group which may be substituted, an aralkyl group which may be substituted, and an alkoxy group which may be substituted.

[12]
The method for producing the polyphenylene ether according to item [11] above, comprising:
passing the polyphenylene ether through a magnetic separating machine equipped with a magnetic force-generating source so as to make a content of a metal magnetic material in the polyphenylene ether to be 0.001 ppm or higher and lower than 0.500 ppm.

[13]
The method for producing the polyphenylene ether according to item [11] above, comprising:
passing the polyphenylene ether through a magnetic separating machine equipped with a magnetic force-generating source so as to make a content of a metal magnetic material in the polyphenylene ether to be 0.001 ppm or higher and lower than 0.100 ppm.

[14]
The method for producing the polyphenylene ether according to any one of items [11] to [13], wherein the metal magnetic material is a metal magnetic material comprising an Fe element.

[15]
The method for producing the polyphenylene ether according to any one of items [11] to [14] above, wherein the polyphenylene ether is a powder having a volume-average particle diameter of 3 mm or smaller.

[16]
The method for producing the polyphenylene ether according to any one of items [11] to [15] above, wherein the polyphenylene ether is a powder having a loose apparent specific gravity of 0.4 or higher.

[17]
The method for producing the polyphenylene ether according to any one of items [11] to [16] above, wherein the polyphenylene ether is a powder having a specific surface area of 1 m²/g or larger.

[18]
The method for producing the polyphenylene ether according to any one of items [11] to [17] above, wherein when the polyphenylene ether is passed through the magnetic separating machine equipped with the magnetic force-generating source, a magnetic force in a region for removing a metal magnetic material from the polyphenylene ether is 0.6 T or higher.

[19]
The method for producing the polyphenylene ether according to any one of items [11] to [18], wherein the magnetic force-generating source of the magnetic separating machine is an electromagnet.

[20]
The method for producing the polyphenylene ether according to any one of items [11] to [19], wherein the polyphenylene ether is passed through between the magnetic force-generating source arranged with a spacing of 15 mm or smaller.

The method for producing the polyphenylene ether according to any one of items [11] to [20], wherein the magnetic separating machine has a magnetic force-effective separation length of 100 mm or longer.

Advantageous Effects of Invention

The present invention can provide a polyphenylene ether capable of effectively suppressing the occurrence of black foreign matters, and excellent in electric characteristics and the appearance characteristic, and an effective method for producing the polyphenylene ether.

MODE FOR CARRYING OUT THE INVENTION

Hereinafter, an embodiment according to the present invention (hereinafter referred to as "the present embodiment") will be described in detail.

The present invention is not limited to the following embodiment, and various changes and modifications may be made within the scope of the gist.

[Polyphenylene Ether]

The polyphenylene ether according to the present embodiment is a polyphenylene ether having a content of a metal magnetic material of 0.001 ppm or higher and lower than 1.000 ppm.

(Structure)

The polyphenylene ether according to the present embodiment has a structural unit represented by the following formula (1), and may have a plurality of kinds of structural units.

[Formula 2]

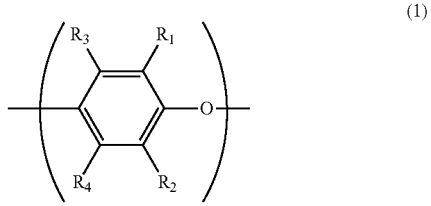

(1)

In the above general formula (1), $R_1$, $R_2$, $R_3$ and $R_4$ each independently represents one selected from the group consisting of a hydrogen atom, a halogen atom, an alkyl group which may be substituted, an alkenyl group which may be substituted, an alkynyl group which may be substituted, an aryl group which may be substituted, an aralkyl group which may be substituted, and an alkoxy group which may be substituted.

In the above general formula (1), examples of a halogen atom represented as $R_1$, $R_2$, $R_3$ and $R_4$ may include a fluorine atom, a chlorine atom and a bromine atom, and a chlorine atom and a bromine atom are preferable.

In the above general formula (1), the term "alkyl group" of an alkyl group which may be substituted and is represented as $R_1$, $R_2$, $R_3$ and $R_4$ represents a straight-chain or branched-chain alkyl group preferably having 1 to 6 carbon atoms and more preferably having 1 to 3 carbon atoms; and examples thereof may include methyl, ethyl, propyl, isopropyl, butyl, isobutyl, sec-butyl, tert-butyl, pentyl and hexyl, and methyl and ethyl are preferable and methyl is more preferable.

In the above general formula (1), examples of the term "alkenyl group" of an alkenyl group which may be substituted and is represented as $R_1$, $R_2$, $R_3$ and $R_4$ may include ethenyl, 1-propenyl, 2-propenyl, 3-butenyl, pentenyl and hexenyl, and ethenyl and 1-propenyl are preferable.

In the above general formula (1), examples of the term "alkynyl group" of an alkynyl group which may be substituted and is represented as $R_1$, $R_2$, $R_3$ and $R_4$ may include ethynyl, 1-propynyl, 2-propynyl (propargyl), 3-butynyl, pentynyl and hexynyl, and ethynyl, 1-propynyl and 2-propynyl (propargyl) are preferable.

In the above general formula (1), examples of the term "aryl group" of an aryl group which may be substituted and is represented as $R_1$, $R_2$, $R_3$ and $R_4$ may include phenyl and naphthyl, and phenyl is preferable.

In the above general formula (1), examples of the term "aralkyl group" of an aralkyl group which may be substituted and is represented as $R_1$, $R_2$, $R_3$ and $R_4$ may include benzyl, phenethyl, 2-methylbenzyl, 4-methylbenzyl, α-methylbenzyl, 2-vinylphenethyl and 4-vinylphenethyl, and benzyl is preferable.

In the above general formula (1), the term "alkoxy group" of an alkoxy group which may be substituted and is represented as $R_1$, $R_2$, $R_3$ and $R_4$ represents a straight-chain or branched-chain alkoxy group preferably having 1 to 6 carbon atoms and more preferably having 1 to 3 carbon atoms; and examples thereof may include methoxy, ethoxy, propoxy, isopropoxy, butoxy, sec-butoxy, tert-butoxy, pentyloxy and hexyloxy, and methoxy and ethoxy are preferable.

In the above general formula (1), an alkyl group, an aryl group, an alkenyl group, an alkynyl group, an aralkyl group and an alkoxy group which are represented as $R_1$, $R_2$, $R_3$ and $R_4$ may be substituted at substitutable positions with one or two or more predetermined substituents.

Examples of such a substituent may include a halogen atom (for example, a fluorine atom, a chlorine atom, a bromine atom), an alkyl group having 1 to 6 carbon atoms (for example, methyl, ethyl, propyl, isopropyl, butyl, isobutyl, sec-butyl, tert-butyl, pentyl, hexyl), an aryl group (for example, phenyl, naphthyl), an alkenyl group (for example, ethenyl, 1-propenyl, 2-propenyl), an alkynyl group (for example, ethynyl, 1-propynyl, 2-propynyl), an aralkyl group (for example, benzyl, phenethyl), and an alkoxy group (for example, methoxy, ethoxy).

(Reduced Viscosity)

The polyphenylene ether according to the present embodiment preferably has a reduced viscosity (ηsp/c) of 0.20 dL/g or higher. Thereby, a polyphenylene ether having sufficient heat resistance can be obtained.

The term "reduced viscosity (ηsp/c)" refers to a reduced viscosity of a chloroform solution of a polyphenylene ether in a concentration of 0.5 g/dL under a temperature condition of 30° C.

The polyphenylene ether according to the present embodiment more preferably has a reduced viscosity (ηsp/c) of 0.25 dL/g or higher, and still more preferably 0.28 dL/g or higher.

The reduced viscosity (ηsp/c) is a value varying depending on the amount of a good solvent, the amount of a catalyst, the feed amount and feed rate of an oxygen-containing gas in a polymerization solution, and the concentration of each phenol compound in the polymerization solution. Therefore, in order to control the reduced viscosity (ηsp/c) in the above range, these polymerization conditions may be regulated.

On the other hand, the upper limit of the reduced viscosity (ηsp/c), for example, in a case where the polyphenylene ether according to the present embodiment is used for processing by extrusion molding or the like, is preferably 1.5 dL/g or lower, more preferably 1.3 dL/g or lower, and still more preferably 1.1 dL/g or lower, from the viewpoint of suppressing the decrease of molding fluidity and the decrease of processability. Additionally, from the viewpoint of shortening the production time, the reduced viscosity (ηsp/c) is further preferably 0.8 dL/g or lower, and much further preferably 0.7 dL/g or lower.

The reduced viscosity can be obtained by measurement of a chloroform solution of a polyphenylene ether powder in 0.5 g/dL by using an Ubbelohde viscometer tube under a condition of 30° C.

(Shape)

The shape of the polyphenylene ether according to the present embodiment may be powder-shaped or pellet-shaped, but is preferably powder-shaped.

The polyphenylene ether is preferably a powder having a volume-average particle diameter of 3 mm or smaller from the viewpoint of the transportation efficiency, the meterability in melt kneading with other components, and the like. The volume-average particle diameter is more preferably 2 mm or smaller, and still more preferably 1 mm or smaller.

With the polyphenylene ether particle being made smaller, whereas the "loose apparent specific gravity" described later is likely to become lower, the "specific surface area" described later becomes larger. By contrast, if the particle diameter is made large from the viewpoint of improving the handleability of the powder, the specific surface area decreases.

From the viewpoint of a balance between the "loose apparent specific gravity" and the "specific surface area" described above, the volume-average particle diameter of the polyphenylene ether particle is preferably in a range of 50 μm to 2,000 μm, more preferably in a range of 100 μm to 1,000 μm, and still more preferably in a range of 150 μm to 1,000 μm.

The volume-average particle diameter can be measured, for example, by "dispersing" a polyphenylene ether powder in methanol, and then measuring by using a laser diffraction particle size analyzer, SALD3100, made by Shimadzu Corp.

(Loose Apparent Specific Gravity)

The polyphenylene ether according to the present embodiment is preferably a powder having a loose apparent specific gravity of 0.4 or higher. Thereby, the polyphenylene ether becomes one which is excellent in the transportation efficiency when the polyphenylene ether is packed in a predetermined container and transported, the meterability when being handled, and the powder handleability when being dissolved in a solvent. The loose apparent specific gravity is more preferably 0.45 or higher, still more preferably 0.48 or higher, and further still more preferably 0.5 or higher.

The loose apparent specific gravity can be measured using a powder tester (Powder Tester Type PT-E, made by Hosokawa Micron Corp.) and using a metal container of 100 cc in volume.

(Specific Surface Area)

The polyphenylene ether according to the present embodiment is preferably a powder having a specific surface area of 1 $m^2/g$ or larger from the viewpoint of raising the affinity for other additives such as a flame retardant.

Since a powder having a large specific surface area generally has a large area with which additives having high affinity for the polyphenylene ether fit, the affinity becomes high; so the powder has such a merit that when a polyphenylene ether resin composition is manufactured, the polyphenylene ether and the additives can be fed together at the feed time of raw materials.

The polyphenylene ether powder more preferably has a specific surface area of 2 $m^2/g$ or larger, still more preferably 5 $m^2/g$ or larger, and further still more preferably 10 $m^2/g$ or larger.

The specific surface area can be measured, for example, by BET method. The BET method specifically involves making a vacuum state at 120° C. for 8 hours as a pretreatment, using the constant-volume method, and measuring an adsorption desorption isothermal curve using nitrogen. The adsorption temperature is set at 77K, and an adsorbate to be used is nitrogen. The specific surface area is calculated using BEL-SORP-mini (BEL JAPAN, Inc.) for the measurement.

(Metal Magnetic Material)

As described above, the polyphenylene ether according to the present embodiment is a polyphenylene ether containing 0.001 ppm or more and less than 1.000 ppm of a metal magnetic material.

The metal magnetic material component used herein refers to one which is solid at room temperature.

The metal magnetic material includes any of a single substance, an oxide and an alloy, and also includes one containing two or more elements. The metal magnetic material includes, for example, one in which at least one element is constituted of a transition metal element.

A metal magnetic material is a metal satisfying $\chi > 0$ in the following expression.

$\chi$ is a susceptibility, and is represented by the following expression (2).

[Expression 1]

$$\chi = \frac{M}{H} \qquad (2)$$

In the above expression (2), M represents a magnetic moment per unit volume; and H represents a magnetic field.

In the polyphenylene ether according to the present embodiment, the content of a metal magnetic material is made to be lower than 1.000 ppm from the viewpoint of imparting high electric characteristics, even in the case where the polyphenylene ether is made into low-thickness molded products and films. The content of the metal magnetic material is preferably lower than 0.500 ppm, more preferably lower than 0.200 ppm, still more preferably lower than 0.100 ppm, further preferably lower than 0.050 ppm, much further preferably lower than 0.020 ppm, and especially preferably lower than 0.010 ppm.

In the polyphenylene ether according to the present embodiment, making the content of a metal magnetic material to be 0.001 ppm or higher can provide the polyphenylene ether excellent in color tone.

The content of a metal magnetic material in a polyphenylene ether can be measured, for example, by the following method.

The polyphenylene ether is dissolved in chloroform which has been passed through a 0.2-μm membrane filter (Millex-SLLGH13, made by Merck Millipore), and subjected to a centrifugal machine so as to precipitate the metal magnetic material. At this time, a magnet of 0.5 T or higher, whose weight has been weighed, is put on the bottom of a container charged in the centrifugal machine. Thereafter, a supernatant is discarded; and the magnet and the metal magnetic material are again dispersed in chloroform, and subjected to the centrifugal machine so as to precipitate the metal magnetic material and to make it adsorbed on the magnet on the bottom. This operation is repeated several times, and thereafter, the magnet on the bottom is recovered.

The magnet on the bottom thus obtained and having adsorbed the metal magnetic material is dried; and the metal magnetic material contained in the polyphenylene ether is quantitatively determined from the weight change before and after the centrifugal separation.

A method for regulating the content of a metal magnetic material in the polyphenylene ether according to the present embodiment to be 0.001 ppm or higher and lower than 1.000 ppm may includes the following methods such as (1) a method in which a polyphenylene ether is subjected to a contacting treatment with a strong acid, (2) a method in which the metal magnetic material in a polyphenylene ether is subjected to a separation treatment by a magnetic force, and (3) a method in which a polyphenylene ether obtained by using a glass-made or glass lining-treated polymerization tank and a predetermined amount of the metal magnetic material are mixed.

<Contacting Treatment with a Strong Acid>

This method is one in which a polyphenylene ether obtained by polymerizing a predetermined monomer is brought into contact with a strong acid.

The strong acid may includes hydrochloric acid, nitric acid, sulfuric acid, and aqua regia.

The method specifically includes a method in which a strong acid prepared by mixing concentrated hydrochloric acid and concentrated nitric acid in a mixing ratio of 3:1 to 1:3 is brought into contact with a polyphenylene ether.

After the both are contacted for at least 1 min, the contacted mixture is filtered and sufficiently washed with water, and thereafter dried so as to obtain a polyphenylene ether in which the content of a metal magnetic material is lower than 1.000 ppm.

<Magnetic Force Separation Treatment>

This method is one in which a polyphenylene ether and a metal magnetic material contained therein are separated using a magnetic force (magnetic force-generating source). The method specifically involves passing the polyphenylene ether through a predetermined magnetic separating machine to separate the polyphenylene ether and the metal magnetic material by the magnetic force. If a powdery polyphenylene ether is used, the content of the metal magnetic material can be reduced largely, which is preferable.

<Mixing with a Metal Magnetic Material>

By using a glass-made or glass lining-treated polymerization tank in a polymerization step of a polyphenylene ether, a polyphenylene ether containing no metal magnetic material can be obtained. By mixing such a polyphenylene ether and a predetermined amount of a metal magnetic material, a polyphenylene ether containing a prescribed amount of the metal magnetic material can be obtained. Although the mixing method usable may be a well-known method, in the case of using an iron-made mixing apparatus, no heating is preferable from the viewpoint of preventing the contamination with metals.

The metal magnetic material may includes a metal magnetic material containing an Fe element. The metal magnetic material containing an Fe element may includes an Fe single substance, oxides originated from Fe, ferroalloys containing Fe as a component, and minerals containing Fe. Examples thereof may include iron, iron oxides, chromium steels of iron-chromium alloys, chromium-nickel steels of iron-chromium-nickel alloys, a stainless steel of 18% chromium and 8% nickel, magnetite, magnetic pyrite, ilmenite, hematite, iron ore, siderite, arsenopyrite, limonite, pyrite, lepidocrocite, goethite and iron sand.

In the case where a metal magnetic material contains an Fe element, the content of an Fe element contained in the polyphenylene ether according to the present embodiment is preferably 0.001 ppm or higher and lower than 0.100 ppm.

Also in the case where low-thickness molded products and films are manufactured by molding the polyphenylene ether according to the present embodiment or a composition containing the polyphenylene ether, the content of an Fe element is preferably lower than 0.100 ppm from the viewpoint of imparting high electric characteristics.

By making the content of an Fe element to be 0.001 ppm or higher, a polyphenylene ether excellent in color tone can be obtained. The content of an Fe element is more preferably lower than 0.050 ppm, still more preferably lower than 0.020 ppm, and further still more preferably lower than 0.010 ppm.

The content of an Fe element contained in the polyphenylene ether according to the present embodiment can be measured, for example, by the following method.

First, 100 g of a polyphenylene ether is dissolved in about 2 L of chloroform, and suction filtered using a filter of A500A090C made by Advantech Co., Ltd. 200 mL of chloroform is sprinkled on the filter used for the filtration, and is suction filtered. This operation is repeated several times, and the obtained filter is dried at normal temperature and normal pressure.

The filter is immersed in a liquid containing 1N hydrochloric acid and 1N nitric acid to be thereby permeated with the liquid for 1 hour. Thereafter, a part of the liquid is sampled, and quantitatively determined by ICP-MS. The filter is thereafter further permeated with the liquid for 1 hour; and a part of the liquid is sampled, and again quantitatively determined by ICP-MS. This operation is repeated until the value becomes stable, and a stabilized value is taken as a quantitative value. At least 500 g is analyzed and an average value is calculated to thereby determine the content of an Fe element.

In the polyphenylene ether according to the present embodiment, the content of a metal magnetic material having a maximum breadth of 150 μm or larger is preferably 0.1 particle/kg or lower in fine processing or low-thickness molding, from the viewpoint of suppressing of clogging of a molding metal mold, molding faults and metal mold damage, and from the viewpoint of suppressing defects when the polyphenylene ether is made into films and sheets.

That the maximum breadth of a metal magnetic material is 150 μm or larger can be verified by observing whether the metal magnetic material has passed through a sieve (mesh) of a sieve opening of 150 μm.

The specific method may include a method in which a polyphenylene ether is dissolved in chloroform, and subjected to a centrifugal machine so as to precipitate a metal magnetic material; a supernatant is discarded; and the metal magnetic material is again dispersed in chloroform, and subjected to the centrifugal machine so as to precipitate the metal magnetic material; this operation is repeated several times, and a magnet is approached to the bottom of the outside of the container so as to isolate the metal magnetic material; and the metal magnetic material thus obtained is subjected to a drying treatment and thereafter passed through the sieve of a sieve opening of 150 μm; and the number of particles of the metal magnetic material not having passed therethrough per unit weight of the metal magnetic material is calculated.

More preferably, the content of the metal magnetic material of 100 μm or larger is 0.1 particle/kg or lower; and still more preferably, the content of the metal magnetic material of 50 μm or larger is 0.1 particle/kg or lower.

A polyphenylene ether in which the content of a metal magnetic material having a maximum breadth of 150 μm or larger is 0.1 particle/kg or lower can be obtained by the above-mentioned (method in which a polyphenylene ether is brought into contact with a strong acid), (method in which a polyphenylene ether is subjected to a magnetic force separation treatment) or (method in which a polyphenylene ether and a predetermined amount of a metal magnetic material are mixed).

The polyphenylene ether containing 0.001 ppm or more and less than 1.000 ppm of a metal magnetic material according to the present embodiment is a polyphenylene ether excellent in color tone in which the color index value is low and the change rate of the color index value before and after heating is low.

Polyphenylene ether is known to be generally colored by heating when being molded, compressed, or melt kneaded with other resins and the like. Therefore, a polyphenylene ether having a lower color index value after heating makes the polyphenylene ether better in color tone. The term "polyphenylene ether after heating" refers to a polyphenylene ether after melt kneading, a polyphenylene ether after molding and a polyphenylene ether after compression.

An example of a typical method of measuring the color index value of a polyphenylene ether after heating is a simple method of measuring a color index value (C. I. heat) of a polyphenylene ether compressed at 310° C. for 20 min at a pressure of 10 MPa.

The color index (C. I.) of a polyphenylene ether is determined as follows.

First, a chloroform solution of a polyphenylene ether in a concentration of 0.05 g/mL is made by dissolving the polyphenylene ether in chloroform. The same chloroform as used for dissolving the polyphenylene ether is charged in a quartz cell of 1 cm in cell length, and the absorbance of the pure chloroform by ultraviolet light (wavelength: 480 nm) is measured, and taken to be 0.

Then, the chloroform solution of the polyphenylene ether prepared in the above is charged in the same cell, and measured for the absorbance at 480 nm.

The absorbance of the pure chloroform is subtracted from the absorbance of the chloroform solution of the polyphenylene ether, and the difference is divided by the polyphenylene ether concentration of the chloroform solution of the polyphenylene ether, and the quotient is defined as a color index (C. I. heat) of the polyphenylene ether.

The color index value after heating (C. I. heat) is preferably as low as possible from the viewpoint of color toning, and specifically, is preferably 4.0 or lower, more preferably 3.5 or lower, still more preferably 3.0, and further still more preferably 2.5 or lower.

[Method for Producing a Polyphenylene Ether]

The method for producing a polyphenylene ether according to the present embodiment comprises the steps of polymerizing a phenol compound so as to obtain a polyphenylene ether represented by the following formula (1), and passing the polyphenylene ether through a magnetic separating machine equipped with a predetermined magnetic force-generating source so as to make the content of a metal magnetic material to be 0.001 ppm or higher and lower than 1.000 ppm.

[Formula 3]

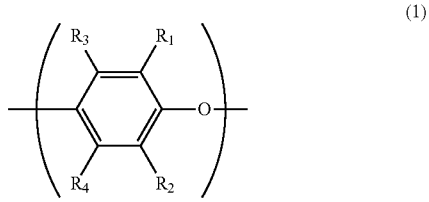

(1)

In the above formula (1), $R_1$, $R_2$, $R_3$ and $R_4$ each independently represents one selected from the group consisting of a hydrogen atom, a halogen atom, an alkyl group which may be substituted, an aryl group which may be substituted, an aralkyl group which may be substituted, and an alkoxy group which may be substituted.

(Step of Polymerizing a Phenol Compound)

First, the step of polymerizing a phenol compound to produce a polyphenylene ether will be described.

<Phenol Compound>

Examples of phenol compounds for production of the polyphenylene ether may include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis-(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis-(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol and 2,6-dimethyl-3-t-butylphenol.

Particularly since being inexpensive and easily available, 2,6-dimethylphenol, 2,6-diethylphenol, 2,6-diphenylphenol, 2,3,6-trimethylphenol and 2,5-dimethylphenol are preferable, and 2,6-dimethylphenol and 2,3,6-trimethylphenol are more preferable.

The above-mentioned phenol compounds may be used singly or in combination of two or more.

For example, preferable are a method of using a combination of 2,6-dimethylphenol and 2,6-diethylphenol, a method of using a combination of 2,6-dimethylphenol and 2,6-diphenylphenol, a method of using a combination of 2,3,6-trimethylphenol and 2,5-dimethylphenol, and a method of using a combination of 2,6-dimethylphenol and 2,3,6-trimethylphenol.

These mixing ratios can be selected optionally.

In phenol compounds to be used, small amounts of m-cresol, p-cresol, 2,4-dimethylphenol, 2,4,6-trimethylphenol and the like, which are contained as by-products in production, may be contained.

<Polymerization Method>

The polyphenylene ether according to the present embodiment can be produced using the above-mentioned phenol compounds by precipitation polymerization or solution polymerization described below.

[Precipitation Polymerization]

In a step of producing the polyphenylene ether, in the case of carrying out precipitation polymerization, the polymerization step is divided into the following stages of an early polymerization period, a middle polymerization period and a late polymerization period.

Early polymerization period: a period from the initiation of introduction of an oxygen-containing gas to the beginning of observation of precipitation.

Middle polymerization period: a period from the start of the precipitation until a slurry becomes stabilized.

Late polymerization period: a period from the time when the slurry becomes stabilized to the completion of the polymerization.

In the stages, the time until the precipitation occurs and the time the slurry becomes stabilized vary depending on the amount of a good solvent, the kind of a monomer and the concentration of the monomer.

The precipitation state of a polymer can be suitably observed visually.

The observation method specifically includes a method in which the precipitation state of the polymer is observed visually through an inspection window of a predetermined reactor, a method in which a polymerization solution is extracted from a sampling port to a transparent container of glass or the like, and the precipitation state is observed visually, and other methods.

With respect to an indication to start the visual observation of the state of the polymer, depending on the amount of a phenol compound contained in a polymerization system and also the amount of a good solvent or a poor solvent to the polyphenylene ether, the precipitation of the polymer starts to be cautiously observed preferably not until the polymerization ratio reaches 80%, more preferably not until the polymerization ratio reaches 70%, and still more preferably not until the polymerization ratio reaches 50%.

In the step of polymerizing the polyphenylene ether according to the present embodiment, a polymerization form is preferable in which also after precipitation has been observed in a polymerization solvent, the polymerization is continued with the precipitation being maintained in the middle polymerization period, and completed in the late polymerization period.

In the precipitation polymerization, use of a poor solvent having a high hydrophilicity is likely to easily reduce the amount of metal magnetic material foreign matters included inside the polyphenylene ether resin particle. Examples of the poor solvent having a high hydrophilicity may include methanol, ethanol, propanols, butanols, pentanols, hexanols, ethylene glycol and acetone. Particularly solvents miscible with water in any proportion have a high hydrophilicity, and examples thereof may include methanol, ethanol, propanol and acetone. These poor solvents may contain water.

[Solution Polymerization]

A polymerization method, in which when the polyphenylene ether is produced, a state that the polyphenylene ether is dissolved in a good solvent used for the polymerization is made during the polymerization and at the completion of the polymerization, is referred to as a solution polymerization.

In the case where the polyphenylene ether precipitates along with the progress of the polymerization, the polymerization in the solution state can be continued and completed by processes such as raising the temperature at the early polymerization period or in the course of the polymerization, increasing the amount of a good solvent to a monomer, adding a monomer in the course of the polymerization, and selecting a polymerization solvent in which no precipitation occurs.

After the completion of the polymerization, the polyphenylene ether can be isolated by a method of adding a poor solvent to the polymerization solution in which the polymerization has completed, a method of drying the polymerization solution, or other methods.

In the solution polymerization, use of a poor solvent having a high hydrophilicity as a poor solvent used when the polyphenylene ether is isolated from the polymerization solution in which the polymerization has completed is likely to easily reduce the amount of metal magnetic material foreign matters included inside the polyphenylene ether resin particle.

Examples of the poor solvent having a high hydrophilicity may include methanol, ethanol, propanols, butanols, pentanols, hexanols, ethylene glycol and acetone.

In the case where the solvent is mixed with water in an optional proportion, and used, the solvent having a high hydrophilicity is preferably used, and such a solvent may include methanol, ethanol, propanol and acetone.

Since a metal magnetic material has a high hydrophilicity, use of a poor solvent having a high hydrophilicity in the precipitation polymerization and the solution polymerization is likely to easily disperse the metal magnetic material in the solvent rather than to cause the metal magnetic material to be present inside the polyphenylene ether resin particle. Use of the poor solvent having a high hydrophilicity in the precipitation polymerization and the solution polymerization makes the removal of the metal magnetic material easy.

In the polymerization step of the polyphenylene ether according to the present embodiment, in any of the precipitation polymerization and the solution polymerization described above, the polymerization is preferably carried out with an oxygen-containing gas being fed.

Gases usable as the oxygen-containing gas are pure oxygen, a gas in which oxygen and an inert gas such as nitrogen are mixed in an optional proportion, air, a gas in which air and an inert gas such as nitrogen or a rare gas are mixed in an optional proportion, and the like.

The pressure in the polymerization reaction system during the polymerization reaction may be normal pressure, but as required, the pressure usable may be a reduced pressure or an elevated pressure.

The feed rate of an oxygen-containing gas can be selected optionally in consideration of the heat removal, the polymerization rate and the like, but is preferably 5 NmL/min or higher, and more preferably 10 NmL/min or higher, in terms of pure oxygen per 1 mol of a phenol compound used in the polymerization.

<Additives>

To the polymerization reaction system of the polyphenylene ether according to the present embodiment, additives may be added, such as hydroxides of alkaline metals, hydroxides of alkaline earth metals, alkoxides of alkaline metals, neutral salts such as magnesium sulfate and calcium chloride, and zeolite.

A surfactant conventionally known to have an effect of improving the polymerization activity may further be added to the polymerization solvent. Examples of such a surfactant may include trioctylmethylammonium chloride known as Aliquat336 and CapRiquat (trade name, made by Dojindo Laboratories). The use amount of an additive is preferably in the range not exceeding 0.1% by mass with respect to the total amount of the polymerization reaction raw material.

<Catalyst>

In the polymerization of the polyphenylene ether according to the present embodiment, a predetermined catalyst is preferably used. Catalysts usable are well-known catalyst systems generally used in production of polyphenylene ether.

Examples thereof may include catalysts composed of a transition metal ion having the redox ability and an amine compound capable of forming a complex with the transition metal ion, and specifically may include catalytic systems composed of a copper compound and an amine, catalytic systems composed of a manganese compound and an amine, and catalytic systems composed of a cobalt compound and an amine.

Since the polymerization reaction progresses efficiently under a slightly alkaline condition, an alkali or further an amine may be slightly added thereto.

A suitable catalyst in the polymerization step of the polyphenylene ether according to the present embodiment may include a catalyst containing a copper compound, a halogen compound and a diamine compound represented by the following general formula (3) as constituting components.

[Formula 4]

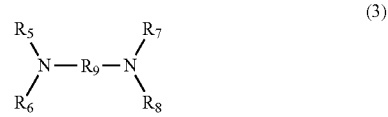

(3)

In the above general formula (3), $R_5$, $R_6$, $R_7$ and $R_8$ each independently represents one selected from the group consisting of a hydrogen atom and straight-chain or branched-chain alkyl groups having 1 to 6 carbon atoms, and all thereof are not simultaneously hydrogen; and $R_9$ denotes a straight-chain or branched-chain alkylene group having 2 to 5 carbon atoms.

An usable example of the copper compound constituting a catalyst component may include a cuprous compound, a cupric compound or a mixture thereof.

Examples of the cuprous compound may include cuprous chloride, cuprous bromide, cuprous sulfate and cuprous nitrate.

Examples of the cupric compound may include cupric chloride, cupric bromide, cupric sulfate and cupric nitrate.

Above all, especially preferable copper compounds are cuprous chloride, cupric chloride, cuprous bromide and cupric bromide.

These copper compounds may be synthesized from an oxide (for example, cuprous oxide), a carbonate salt, a hydroxide and the like, and a corresponding halogen or acid. For example, one copper compound can be synthesized by mixing cuprous oxide and a solution of a hydrogen halide.

Examples of the halogen compound constituting a catalyst component may include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide and tetraethylammonium iodide. These can be used as an aqueous solution or as a solution using a proper solvent.

These halogen compounds may be used singly or in combination of two or more.

Preferable halogen compounds are an aqueous solution of hydrogen chloride and an aqueous solution of hydrogen bromide.

The use amount of the compound is not especially limited, but is preferably 2 times or more and 20 times or less in terms of halogen atom with respect to the molar amount of copper atom; and the preferable use amount of a copper atom is in the range of 0.02 mol to 0.6 mol with respect to 100 mol of a phenol compound to be used.

Examples of the diamine compounds represented by the above general formula (3) may include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-di-n-propylethylenediamine, N-i-propylethylenediamine, N,N'-di-i-propylethylenediamine, N-n-butylethylenediamine, N,N'-di-n-butylethylenediamine, N-t-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane and N,N,N',N'-tetramethyl-1,5-diaminopentane.

Preferable diamine compounds are ones whose alkylene group ($R_9$) connecting two nitrogen atoms has 2 or 3 carbon atoms.

The use amount of the diamine compound is not especially limited, but is usually in the range of 0.01 mol to 10 mol with respect to 100 mol of a phenol compound to be used.

Then, other components constituting the polymerization catalyst will be described.

In the polymerization catalyst used in the polymerization step of the polyphenylene ether, in addition to the above-mentioned catalyst components, for example, a tertiary monoamine compound or a secondary monoamine compound may be contained singly or in combination thereof.

The tertiary monoamine compounds are aliphatic tertiary amines including alicyclic tertiary amines.

Examples thereof may include trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine.

These tertiary monoamines may be used singly or in combination of two or more. The use amount thereof is not especially limited, but is preferably 15 mol or less with respect to 100 mol of a phenol compound to be polymerized.

The secondary monoamine compounds applicable are secondary aliphatic amines.

Examples thereof may include dimethylamine, diethylamine, di-n-propylamine, di-i-propylamine, di-n-butylamine, di-i-butylamine, di-t-butylamine, dipentylamine, dihexylamine, dioctylamine, didecylamine, dibenzylamine, methylethylamine, methylpropylamine, methylbutylamine and cyclohexylamine.

As the secondary monoamine compounds, ones containing an aromatic also are applicable.

Examples thereof may include N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline and diphenylamine.

The above-mentioned secondary monoamine compounds may be used singly or in combination of two or more.

The use amount of the secondary monoamine compound is not especially limited, but is suitably 15 mol or less with respect to 100 mol of a phenol compound to be polymerized.

(Step of Recovering the Polyphenylene Ether)

After the polymerization reaction of the polyphenylene ether is carried out as described above, the obtained polyphenylene ether is post-treated, and recovered.

The post-treatment method after the completion of the polymerization reaction is not especially limited, but usually involves adding an acid such as hydrochloric acid or acetic acid, ethylenediaminetetraacetic acid (EDTA) and its salt, nitrilotriacetic acid and its salt, and the like to a reaction liquid so as to deactivate the catalyst.

Thereafter, since the polymerization solution at the completion of the polymerization is in a state that the polyphenylene ether is precipitated, in order to clean and remove the catalyst, a cleaning treatment using a solution containing as a main component a solvent having a low dissolution ability of the polyphenylene ether is preferably repeatedly carried out.

Thereafter, by carrying out a drying treatment using a drier, the polyphenylene ether can be recovered as a powder.

The drying treatment is carried out at least at a temperature of 60° C. or higher, preferably 80° C. or higher, more preferably 120° C. or higher, still more preferably 140° C. or higher, and further still more preferably 150° C. or higher.

If the drying of the polyphenylene ether is carried out at 60° C. or lower, the content of aromatic hydrocarbons in the polyphenylene ether cannot be suppressed to less than 1.5% by mass efficiently, and there arises a risk of generating odors at heat processing.

In order to obtain the polyphenylene ether highly efficiently, effective are a method of elevating the drying temperature, a method of raising the vacuum degree in the drying atmosphere, a method of carrying out stirring during drying, and the like, but especially the method of elevating the drying temperature is preferable from the viewpoint of the production efficiency.

The drying step preferably uses a mixer concurrently. The mixer includes a stirring-type drier and a tumbling-type drier. This can make the processing amount large and the productivity high.

The drier specifically includes a paddle-type drier, a rotary drier, an SC processor, a KID drier, a ribbon mixing drier, a rotary kiln and a multi-fin processor, and the stirring-type drier is especially preferable, and the paddle-type drier and the SC processor are preferable. These can produce the polyphenylene ether more suppressed in scattering and dusting and excelling in powder handleability.

The polyphenylene ether obtained by the above-mentioned production method is preferably a powder before and after a step of passing the polyphenylene ether through a magnetic separating machine described later.

By passing the polyphenylene ether in a powder state through a magnetic separating machine equipped with a predetermined magnetic force-generating source as described later, the content of a metal magnetic material can be controlled at a very high efficiency.

In this case, the volume-average particle diameter of the polyphenylene ether powder is preferably 3 mm or smaller. Although depending on the particle size distribution, if the size of the powder is larger than 3 mm, the powder clogs the magnetic separating machine; so handling a sufficient processing amount becomes difficult, and carrying out an efficient processing method becomes difficult. The volume-average particle diameter is more preferably 2 mm or smaller, and still more preferably 1 mm or smaller.

With the polyphenylene ether particle being made smaller, whereas the loose apparent specific gravity described later is likely to become lower, the specific surface area described later is improved. By contrast, if the particle diameter is made large from the viewpoint of improving the handleability of a powder, the specific surface area decreases. Therefore, from a balance of the both, the volume-average particle diameter of the polyphenylene ether particle is preferably in a range of 50 μm to 2,000 μm, more preferably in a range of 100 μm to 1,000 μm, and still more preferably in a range of 150 μm to 1,000 μm.

A method for measuring the volume-average particle diameter involves, for example, "dispersing" the polyphenylene ether powder in methanol, and then measuring by using a laser diffraction particle size analyzer, SALD3100, made by Shimadzu Corp.

The loose apparent specific gravity of the polyphenylene ether is preferably 0.4 or higher. Thereby, when the polyphenylene ether is processed using a magnetic separating machine, a practically sufficient processing amount can be achieved. The loose apparent specific gravity of the polyphenylene ether is more preferably 0.45 or higher, still more preferably 0.48 or higher, and further still more preferably 0.5 or higher.

The loose apparent specific gravity of a the polyphenylene ether can be measured using a powder tester (Powder Tester Type PT-E, made by Hosokawa Micron Corp.) and using a metal container of 100 cc in volume.

The specific surface area of a particle constituting the polyphenylene ether powder is preferably 1 $m^2/g$ or larger.

A powder having a large specific surface area is generally chemically active, and makes it easy for a metal magnetic material having a low affinity for the polyphenylene ether to be separated therefrom, allowing efficiently controlling the content of the metal magnetic material.

If the specific surface area is smaller than 1 $m^2/g$, the metal magnetic material may not possibly be removed efficiently, and particularly the removal of the metal magnetic material incorporated inside the particle cannot be carried out efficiently. That is, since the larger the specific surface area, a metal magnetic material is likely to be more easily removed, the specific surface area is more preferably 2 $m^2/g$ or larger, still more preferably 5 $m^2/g$ or larger, and further still more preferably 10 $m^2/g$ or larger.

The specific surface area can be measured, for example, by BET method. The BET method specifically involves making a vacuum state at 120° C. for 8 hours as a pretreatment, using the constant-volume method, and measuring an adsorption desorption isothermal curve using nitrogen. The adsorption temperature is set at 77K, and an adsorbate to be used is nitrogen. The specific surface area is calculated using BEL-SORP-mini (BEL JAPAN, Inc.) for the measurement.

(Step of Removing a Metal Magnetic Material in a Polyphenylene Ether to Obtain a Polyphenylene Ether Having a Content of a Metal Magnetic Material of 0.001 ppm or Higher and Lower than 1.000 ppm)

The polyphenylene ether obtained as described above is passed through a magnetic separating machine equipped with a predetermined magnetic force-generating source so as to obtain a polyphenylene ether having a content of a metal magnetic material of 0.001 ppm or higher and lower than 1.000 ppm.

As the magnetic separating machine equipped with a predetermined magnetic force-generating source, there can be used ones which have a structure having a predetermined passage where the magnetic force-generating source is arranged, and examples thereof include a Magnet Separator made by Daika Co., Ltd., a Magic Catch made by JMI Co., Ltd., and an Electro Magnetic Separator made by Nippon Magnetics, Inc.

By passing the polyphenylene ether through the magnetic separating machine equipped with the magnetic force-generating source, the metal magnetic material contained in the polyphenylene ether is adsorbed by the magnetic force-generating source, and the content of the metal magnetic material can be controlled.

The magnetic force-generating source may include permanent magnets and electromagnets, but is preferably an electromagnet from the viewpoint of the intensity of the magnetic force, and the easiness of recovery of the metal magnetic material.

With respect to the magnetic force of the magnetic force-generating source, a higher magnetic force of a magnetized portion in a region where the polyphenylene ether is passed through and the metal magnetic material is removed can more efficiently remove the metal magnetic material, and the magnetic force in the region is preferably 0.6 T or higher, more preferably 0.8 T or higher, still more preferably 0.9 T or higher, further preferably 1.2 T or higher, and much further preferably 1.6 T or higher.

By passing the polyphenylene ether through a region magnetized by the magnetic force-generating source, a metal magnetic material can be adsorbed.

Examples of a method for supplying the polyphenylene ether to the magnetic separating machine, depending on the structure of the magnetic separating machine, may include a method in which a magnetic separating machine having a predetermined passage equipped with a magnetic force-generating source is used, and the polyphenylene ether is supplied from an upper portion of the passage and is allowed to freely fall.

The shape of the magnetic force-generating source may be of any shape such as a cylindrical shape and a coil shape.

As the magnetic separating machine, for example, there can be used one having a structure in which a cylindrical coil to generate a magnetic field is installed and a slit-shaped magnetic material filter is disposed in the cylindrical body.

The magnetic material filter assumes a magnetic force by a magnetic field generated by the coil, and this becomes a magnetic force-generating source.

Spacings of the magnetic force-generating source through which the polyphenylene ether is passed, that is, spacings of the magnetic material filter are defined by spacings of various types of penetration gaps of lattices, slits, coarse meshes and the like constituting the magnetic material filter, and are preferably 15 mm or smaller, more preferably 10 mm or smaller, still more preferably 7 mm or smaller, and further still more preferably 5 mm or smaller, from the viewpoint of the removal efficiency of a metal magnetic material.

The shape of a magnetic force-generating source is not limited to the structure as described above in which a slit-shaped magnetic material filter is disposed in a cylindrical body, and may be a tubular structure in which no slit-shaped magnetic material filter is installed in a region through which the polyphenylene ether is passed. In this case, the cylindrical body interior corresponds to a magnetic force-generating source, and the tube diameter of the cylinder corresponds to a spacing of the magnetic force-generating source.

From the viewpoint of efficient removal of the metal magnetic material, the number of magnetic material filters is preferably 10 sheets or more, more preferably 12 sheets or more, and still more preferably 15 sheets or more.

The magnetic material filter may be any of a lattice-shaped one, a slit-shaped one and a coarse mesh-shaped one.

After the magnetic field is generated by making a current flow in the coil, the polyphenylene ether is introduced in the cylinder, and metal magnetic material components are adsorbed on the magnetic material filter, and thus removed.

The length of a region, in a passage through which the polyphenylene ether is passed, where the metal magnetic material contained in the polyphenylene ether can be removed, that is, the magnetic force-effective separation length is preferably 100 mm or longer in total. The magnetic force-effective separation length being 100 mm or longer in total can efficiently remove the metal magnetic material. The length is more preferably 110 mm or longer, and still more preferably 120 mm or longer.

The above-mentioned "the magnetic force is effective" in the passage through which the polyphenylene ether is passed is preferably a magnetic force in the region of 0.1 T or higher, and more preferably 0.3 T or higher.

The polyphenylene ether thus obtained has a content of the metal magnetic material of lower than 1.000 ppm, preferably lower than 0.500 ppm, more preferably lower than 0.200 ppm, and still more preferably lower than 0.100 ppm.

[Polyphenylene Ether Resin Compositions]

The polyphenylene ether according to the present embodiment is melt kneaded with conventionally known thermoplastic resins and thermosetting resins so as to make a resin composition.

Examples of the thermoplastic resin and thermosetting resin may include resins such as polyethylene, polypropylene, thermoplastic elastomers, polystyrene, acrylonitrile/styrene resins, acrylonitrile/butadiene/styrene resins, methacrylic resins, vinyl chloride, polyamide, polyacetal, ultrahigh molecular weight polyethylene, polybutylene terephthalate, polymethylpentene, polycarbonate, polyphenylene sulfide, polyether ketone, liquid crystal polymers, polytetrafluoroethylene, polyetherimide, polyarylate, polysulfone, polyether sulfone, polyamidoimide, phenol, urea, melamine, unsaturated polyester, alkyd, epoxy, diallyl phthalate and bismaleimide.

Addition of conventionally known additives and thermoplastic elastomers at the time of melt kneading is more preferable in order to impart effects of conductivity, flame retardancy, impact resistance and the like.

When a resin composition using the polyphenylene ether according to the present embodiment is produced, other additives may be added, for example, plasticizers, stabilizers, modifiers, ultraviolet absorbents, flame retardants, colorants, release agents, fibrous reinforcing materials such as glass fibers and carbon fibers, and fillers such as glass beads, calcium carbonate, talc and clay.

Examples of the stabilizer and the modifier may include phosphorous esters, hindered phenols, sulfur-containing antioxidants, alkanolamines, acid amides, dithiocarbamate metal salts, inorganic sulfides, metal oxides, carboxylic anhydrides, dienophile compounds of styrene, stearyl acrylate or the like, and epoxy group-containing compounds.

These additives may be used singly or in combination of two or more.

Methods for mixing components constituting a polyphenylene ether resin composition can use, for example, a solution blending and deaeration method, an extruder, a heating roll, a banbury mixer, a kneader and a Henschel mixer.

As described before, it is known that when the polyphenylene ether is melt kneaded with other resins, the polyphenylene ether is colored by heating. Therefore, a polyphenylene ether having a lower color index value after heating exhibits a better color tone.

Since the polyphenylene ether containing 0.001 ppm or more and less than 1.000 ppm of the metal magnetic material according to the present embodiment is a polyphenylene ether excellent in color tone in which the color index value is low and the change rate of the color index value before and after heating is low, also the above-mentioned polyphenylene ether resin composition is similarly excellent in the color tone in which the color index value is low and the change rate of the color index value before and after heating is low.

EXAMPLES

Hereinafter, the present invention will be described in detail by way of specific Examples and Comparative Examples, but the scope of the present invention is not limited to the following Examples.

Measurement methods of various physical properties in Examples are shown as follows.

(1. Extraction of a Metal Magnetic Material in a Polyphenylene Ether, and Weighing of the Content)

A polyphenylene ether was dissolved in an excessive amount of chloroform in a 500-mL glass bottle; and thereafter, a magnet of 1.4 T was contacted on the outside of the glass bottle to collect metal magnetic material components in the solution. The collected metal magnetic material components were five times washed with chloroform, and the metal magnetic material components dried at 100° C. for 1 hour were extracted as a metal magnetic material, and weighed.

(1.1 Weighing of the Amount of an Fe Element in a Polyphenylene Ether)

100 g of a polyphenylene ether was dissolved in 2 L of chloroform, and suction filtered using a filter of A500A090C made by Advantech Co., Ltd. 200 mL of chloroform was sprinkled on the filter used for the filtration, and suction filtered. This operation was repeated several times, and the filter obtained was dried at normal temperature and normal pressure.

The filter was immersed in a liquid containing 1N hydrochloric acid and 1N nitric acid so as to be permeated with the liquid for 1 hour. Thereafter, a part of the liquid was sampled, and quantitatively determined by ICP-MS.

The filter was thereafter further permeated with the liquid for 1 hour; and a part of the liquid was sampled, and again quantitatively determined by ICP-MS. This operation was repeated until the value became stable, and a stabilized value was taken as a quantitative value.

The operation was carried out five times, and an average was calculated.

(2. Check for Black Foreign Matters of a Polyphenylene Ether)

A polyphenylene ether was subjected to a heat press treatment (conditions: at 320° C., for 20 min, and at 10 MPa), and 10 sheets of the polyphenylene ether made into 15 cm×15 cm×1 mm thick were manufactured. Five persons checked and observed the 10 sheets using OSL-1, made by Otsuka Optics Co., Ltd., and black foreign matters were evaluated according to the following standard.

There were no black foreign matters observed: ◎

There were two or less particles of black foreign matters on average: ○

There were particles of black foreign matters exceeding two particles on average: X (3. Color Index of a Polyphenylene Ether after Heating)

A chloroform solution of a polyphenylene ether in a concentration of 0.05 g/mL was prepared by heating the polyphenylene ether at a heating temperature of 310° C. for 20 min and under a pressure of 10 MPa at the heating, and thereafter dissolving the polyphenylene ether in chloroform.

The same chloroform as used for dissolving the polyphenylene ether was charged in a quartz cell of 1 cm in cell length, and the absorbance of the pure chloroform by ultraviolet light (wavelength: 480 nm) was measured, and taken to be 0.

Then, the chloroform solution of the polyphenylene ether prepared in the above was charged in the same cell, and measured for the absorbance at 480 nm.

The absorbance of the pure chloroform was subtracted from the absorbance of the chloroform solution of the polyphenylene ether, and the difference was divided by the polyphenylene ether concentration of the chloroform solution of the polyphenylene ether, and the quotient was defined as a color index value, C. I. heat, of the polyphenylene ether.

(4. Volume-Average Particle Diameter of a Polyphenylene Ether)

Polyphenylene ether powders obtained in Examples and Comparative Examples described later were each "dispersed" in methanol. Then, the volume-average particle diameter was measured by using a laser diffraction particle size analyzer, SALD3100, made by Shimadzu Corp.

(5. Loose Apparent Specific Gravity of a Polyphenylene Ether)

The loose apparent specific gravity was measured using a powder tester (Powder Tester Type PT-E, made by Hosokawa Micron Corp.) and using a metal container of 100 cc in volume.

(6. Specific Surface Area of a Polyphenylene Ether)

The specific surface area was measured by BET method. The BET method involved making a vacuum state at 120° C. for 8 hours as a pretreatment, using the constant-volume method, and measuring an adsorption desorption isothermal curve using nitrogen. The adsorption temperature was set at 77K, and as an adsorbate, nitrogen was used. The specific surface area was calculated using BELSORP-mini (BEL JAPAN, Inc.) for the measurement.

(7. Tracking Stability)

A test sample of 15 cm×15 cm×1 mm was used, and as electrodes, platinum was used.

Electrodes were arranged at an interval of 4 mm on the surface of the test sample: a voltage was applied between the electrodes; a 0.1-mass % aqueous solution of ammonium chloride as a test solution was dropped from a height of 25 cm drop by drop every 0.4 sec for 30 sec; and tracking breakdown generated was observed, and the threshold voltage was measured.

The test was carried out at voltages of every additional 50 V, and carried out 5 times for the one voltage.

The test was carried out on 5 test samples for each Example, and the tracking stability was evaluated according to the following standard.

The difference between a maximum value and a minimum value of threshold voltage values of the 5 test samples was lower than 50 V: ○

The difference between a maximum value and a minimum value of threshold voltage values of the 5 test samples was 50 V or higher: X (8. Evaluation of Polymerization Productivity)

A productivity in which one-time operation could polymerize about 100 kg or more was evaluated to be a high productivity and as ◎.

A productivity in which the case of about less than 100 kg was evaluated to be not a very high productivity and as X.

(9. Evaluation of Separation Operability)

A magnetic separating machine described later which could carry out the separation operation of 100 kg or more per 1 hour was judged to have a high separation operability and evaluated as ◎.

One which could carry out the separation operation of only less than 100 kg per 1 hour was judged to have a low separation operability and evaluated as X.

(Production Examples of Polyphenylene Ether Resins)

(PPE-1)

160.8 g of cupric oxide, 1,209.0 g of a 47% hydrogen bromide aqueous solution, 387.36 g of di-t-butylethylenediamine, 1,875.2 g of di-n-butylamine, 5,707.2 g of butyldimethylamine, 826 kg of toluene and 124.8 kg of 2,6-dimethylphenol were charged in a stainless steel-made, 2,000-L, jacket-equipped polymerization tank equipped on the bottom of the polymerization tank with an iron-made sparger to introduce an oxygen-containing gas, a stainless steel-made stirring turbine blade and a stainless steel-made baffle, and on a vent gas line on the upper part of the polymerization tank with a reflux cooler, while a nitrogen gas was being blown in at a flow volume of 13 L/min, and stirred until the mixture became a homogeneous solution and the internal temperature of the reactor became 25° C.

Then, a dried air started to be introduced at a rate of 1,312 NL/min from the sparger into the polymerization tank, and the polymerization was initiated. The aeration was carried out for 142 min, and the internal temperature at the end of the polymerization was controlled to become 40° C.

The polymerization liquid at the end of the polymerization was in a solution state.

The aeration of the dried air was stopped; 100 kg of a 2.5 mass % aqueous solution of an ethylenediaminetetraacetic acid tetrasodium salt (a reagent made by Dojindo Laboratories) was added to the polymerization mixture, and the polymerization mixture was stirred at 70° C. for 150 min, and then allowed to stand; and the resultant was subjected to a liquid-liquid separation (a disc-type centrifugal separating machine made by GEA Group AG) to be thereby separated into an organic phase and a water phase.

The temperature of the organic phase obtained was made room temperature, and methanol was excessively added thereto to thereby manufacture a slurry in which a polyphenylene ether was precipitated. Thereafter, the slurry was filtered using a Basket Centrifuge (0-15 type, made by Tanabe Willtec Inc.).

After the filtration, methanol was excessively charged in the Basket Centol, and again filtered to thereby obtain a wet polyphenylene ether. Then, the wet polyphenylene ether was charged and crushed in a Feather Mill (FM-1S, made by Hosokawa Micron Corp.) equipped with a 10-mm round-hole mesh, and held at 150° C. at 1 mmHg for 1.5 hours using a conical drier to thereby obtain a dry-state polyphenylene ether powder.

The reduced viscosity ($\eta sp/c$)(dL/g) at 30° C. of a chloroform solution of the polyphenylene ether powder in 0.5 g/dL was determined using an Ubbelohde viscometer tube, and was 0.51.

The volume-average particle diameter was 850 μm; the loose apparent specific gravity was 0.52; and the specific surface area was 34 m$^2$/g.

(PPE-2)

A polyphenylene ether was prepared by altering the aeration time of the dried air to the polymerization tank to 124 min. The reduced viscosity ($\eta sp/c$)(dL/g) at 30° C. of a chloroform solution of the polyphenylene ether powder in 0.5 g/dL was determined using an Ubbelohde viscometer tube, and was 0.40. The volume-average particle diameter was 780 μm; the loose apparent specific gravity was 0.52; and the specific surface area was 62 m$^2$/g.

(PPE-3)

1.005 g of cupric oxide, 7.556 g of a 47% hydrogen bromide aqueous solution, 2.421 g of di-t-butylethylenediamine, 11.72 g of di-n-butylamine, 35.67 g of butyldimethylamine, 5.163 kg of toluene and 780 g of 2,6-dimethylphenol were charged in a glass-made, 10-L, jacket-equipped polymerization tank equipped on the bottom of the polymerization tank with a glass-made sparger to introduce an oxygen-containing gas, a Teflon (R)-made stirring turbine blade and a glass-made baffle, and on a vent gas line on the upper part of the polymerization tank with a reflux cooler, while a nitrogen gas was being blown in at a flow volume of 0.2 L/min, and stirred until the mixture became a homogeneous solution and the internal temperature of the reactor became 25° C.

Then, a dried air started to be introduced at a rate of 8.2 NL/min from the sparger into the polymerization tank, and the polymerization was initiated. The aeration was carried out for 158 min, and the internal temperature at the end of the polymerization was controlled to become 40° C.

The polymerization liquid at the end of the polymerization was in a solution state.

The aeration of the dried air was stopped; 2.5 kg of a 2.5 mass % aqueous solution of an ethylenediaminetetraacetic acid tetrasodium salt (a reagent made by Dojindo Laboratories) was added to the polymerization mixture, and the polymerization mixture was stirred at 70° C. for 150 min, and then allowed to stand; and the resultant was subjected to a liquid-liquid separation to be thereby separated into an organic phase and a water phase.

The temperature of the organic phase obtained was made 50° C., and methanol was excessively added thereto to thereby precipitate a polyphenylene ether; thereafter, the resultant was filtered; and the filtrand polyphenylene ether was dispersed in an excessive amount of methanol, and stirred at 50° C. for 30 min, and thereafter again filtered.

The operation was repeated twice to thereby obtain a wet polyphenylene ether.

The white slurry-like polyphenylene ether was filtered using a glass filter, and a wet-state polyphenylene ether as the filtrand was recovered.

Thereafter, the recovered polyphenylene ether was subjected to a vacuum drying treatment at 140° C. at 1 mmHg for 1 hour to thereby obtain a polyphenylene ether powder.

The reduced viscosity ($\eta sp/c$)(dL/g) at 30° C. of a chloroform solution of the polyphenylene ether powder in 0.5 g/dL was determined using an Ubbelohde viscometer tube, and was 0.51. The volume-average particle diameter was 850 μm; the loose apparent specific gravity was 0.51; and the specific surface area was 35 m$^2$/g.

(PPE-4)

A polyphenylene ether was prepared as in the (PPE-3), except for altering the aeration time of the dried air to the polymerization tank to 131 min.

The reduced viscosity ($\eta sp/c$)(dL/g) at 30° C. of a chloroform solution of the polyphenylene ether powder in 0.5 g/dL was determined using an Ubbelohde viscometer tube, and was 0.40. The volume-average particle diameter was 780 μm; the loose apparent specific gravity was 0.50; and the specific surface area was 53 m$^2$/g.

[Magnetic Separating Machine]

In Examples and Comparative Examples described later, an electromagnetic separating machine (product name: CG-180X, made by Nippon Magnetics, Inc.) equipped with a magnetic force-variable apparatus was used.

One type of screens of the following was used, and a plurality sheets thereof were used and the sheets were rotationally clockwise shifted sheet by sheet by 45° as seen from the above, and attached.

A: rod-shaped screen, a screen opening of 5 mm, 20 sheets
B: rod-shaped screen, a screen opening of 10 mm, 20 sheets
C: coarse mesh screen, a screen opening of 3 mm, 25 sheets A metal magnetic material attached to the screen was recovered and weighed.

The metal magnetic material attached to the screen even when a power source of an electromagnet was turned off was recovered by unfixing the screen and hammering it with a hammer.

[Production Examples of Polyphenylene Ethers Involving a Treatment by a Magnetic Separating Machine]

Example 1

A separation operation was carried out on the (PPE-1) using the electromagnetic separating machine equipped with the screen A.

The magnetic flux density was 1.6 T, and the (PPE-1) was passed at a rate of about 200 kg/h.

There was no occurrence of clogging of the screen, and the treatment could be consistently stably carried out. The content of the metal magnetic material of the polyphenylene ether obtained was 0.003 ppm.

Other results are shown in Table 1 shown below.

Example 2

The operation was carried out as in Example 1, except for using the screen of a magnetic flux density of 1.2 T.

There was no occurrence of clogging of the screen, and the treatment could be consistently stably carried out. The content of the metal magnetic material of the polyphenylene ether obtained was 0.030 ppm.

Other results are shown in Table 1 shown below.

Example 3

A separation operation was carried out on the (PPE-1) using the electromagnetic separating machine equipped with the screen B.

The magnetic flux density was 0.8 T, and the (PPE-1) was passed at a rate of about 200 kg/h.

There was no occurrence of clogging of the screen, and the treatment could be consistently stably carried out. The content of the metal magnetic material of the polyphenylene ether obtained was 0.160 ppm.

Other results are shown in Table 1 shown below.

Example 4

The operation was carried out as in Example 3, except for using the screen of a magnetic flux density of 0.5 T. There was no occurrence of clogging of the screen, and the treatment could be consistently stably carried out. The content of the metal magnetic material of the polyphenylene ether obtained was 0.500 ppm.

Other results are shown in Table 1 shown below.

Comparative Example 1

The (PPE-1) was evaluated as it was without the separation operation by the magnetic separating machine. The content of the metal magnetic material of the polyphenylene ether was 1.020 ppm.

Other results are shown in Table 1 shown below.

Comparative Example 2

The (PPE-3) was evaluated as it was without the separation operation by the magnetic separating machine. The content of the metal magnetic material of the polyphenylene ether was 0.000 ppm.

Other results are shown in Table 1 shown below.

Example 5

100 kg of the (PPE-3) and 0.010 g of a steel ball P used in [Verification of influences of metal contamination on a polyphenylene ether] described later were mixed, and the mixture was evaluated as it was without the separation operation by the magnetic separating machine. The content of the metal magnetic material of the polyphenylene ether was 0.100 ppm.

Other results are shown in Table 1 shown below.

Example 6

The operation was carried out as in Example 1, except for using the (PPE-2).

There was no occurrence of clogging of the screen, and the treatment could be consistently stably carried out. The content of the metal magnetic material of the polyphenylene ether obtained was 0.010 ppm.

Other results are shown in Table 1 shown below.

Example 7

The operation was carried out as in Example 6, except for using the screen of a magnetic flux density of 0.8 T.

There was no occurrence of clogging of the screen, and the treatment could be consistently stably carried out. The content of the metal magnetic material of the polyphenylene ether obtained was 0.060 ppm.

Other results are shown in Table 1 shown below.

Comparative Example 3

The (PPE-2) was evaluated as it was without the separation operation by the magnetic separating machine. The content of the metal magnetic material of the polyphenylene ether was 1.080 ppm.

Other results are shown in Table 1 shown below.

Comparative Example 4

The (PPE-4) was evaluated as it was without the separation operation by the magnetic separating machine. The content of the metal magnetic material of the polyphenylene ether was 0.000 ppm.

Other results are shown in Table 1 shown below.

Comparative Example 5

10 kg of the (PPE-1) was melt kneaded using a ZSK25 twin-screw extruder (made by Werner & Pfleiderer GmbH in Germany, number of barrels: 10, and a screw pattern having a screw diameter of 25 mm, and one kneading disc L, one kneading disc R and two kneading discs N) at a barrel set temperature of 310° C. and at a screw rotation frequency of 200 rpm, to manufacture strands at a discharge amount of 10 kg/h.

The melt kneaded strand was immersed in a water bath, and pelletized by a strand cutter. The size of the pellets was 3 mm×3 mm.

A separation operation was carried out on the obtained pellet using the electromagnetic separating machine equipped with the screen A. The magnetic flux density was 1.6 T. Since clogging of the screen occurred when the pellet was passed at a rate of 200 kg/h, the passing rate was inevitably suppressed. The content of the metal magnetic material of the polyphenylene ether obtained was 1.200 ppm.

Other results are shown in Table 1 shown below.

TABLE 1

| | | | Example 1 | Example 2 | Example 3 | Example 4 | Comparative Example 1 | Comparative Example 2 | Example 5 | Example 6 | Example 7 | Comparative Example 3 | Comparative Example 4 | Comparative Example 5 |
|---|---|---|---|---|---|---|---|---|---|---|---|---|---|---|
| PPE | η sp/c | | 0.51 | 0.51 | 0.51 | 0.51 | 0.51 | 0.51 | 0.51 | 0.40 | 0.40 | 0.40 | 0.40 | 0.51 |
| | Average Particle Diameter | μm | 850 | 850 | 850 | 850 | 850 | 850 | 850 | 780 | 780 | 780 | 780 | 3000 |

TABLE 1-continued

|  |  | Example 1 | Example 2 | Example 3 | Example 4 | Comparative Example 1 | Comparative Example 2 | Example 5 | Example 6 | Example 7 | Comparative Example 3 | Comparative Example 4 | Comparative Example 5 |
|---|---|---|---|---|---|---|---|---|---|---|---|---|---|
| Specific Surface Area | m²/g | 34 | 34 | 34 | 34 | 35 | 35 | 35 | 62 | 62 | 62 | 53 | <1 |
| Polymerization Productivity |  | ◎ | ◎ | ◎ | ◎ | ◎ | X | X | ◎ | ◎ | ◎ | X | ◎ |
| Residual Amount of Metal Magnetic Material | ppm | 0.003 | 0.030 | 0.160 | 0.500 | 1.020 | 0.000 | 0.100 | 0.010 | 0.060 | 1.080 | 0.000 | 1.200 |
| Amount of Fe Element | ppb | 2 | 6 | 48 | 190 | 289 | 0 | — | 3 | 10 | 312 | 0 | 610 |
| Check for Black Foreign Matters |  | ◎ | ◎ | ◎ | ○ | X | ◎ | ◎ | ◎ | ◎ | X | ◎ | X |
| C.I. heat |  | 2.50 | 2.45 | 2.75 | 2.85 | 3.85 | 4.10 | 2.45 | 3.20 | 3.25 | 4.30 | 4.80 | — |
| Tracking Stability |  | ○ | ○ | ○ | ○ | X | ○ | ○ | ○ | ○ | ○ | ○ | X |

As shown in Table 1, it was found that in Examples 1 to 7 each, since the content of the metal magnetic material was 0.001 ppm or higher and lower than 1.000 ppm, the polyphenylene ether exhibited no occurrence of black foreign matters and a high quality, and was very excellent in the color tone.

Further even if a metal-made polymerization tank generally used in plants and the like was used, since the content of a metal magnetic material could be controlled to be 0.001 ppm or higher and lower than 1.000 ppm, the polyphenylene ether having a high quality could be produced at a very high productivity.

In Comparative Examples 1 and 3 each, since the content of the metal magnetic material was 1.000 ppm or higher, the tracking stability was inferior; the occurrence of black foreign matters was observed; and additionally, the color tone was inferior.

Comparative Examples 3 and 4 containing no metal magnetic material were inferior in the color tone.

In Comparative Example 5, a large number of the metal magnetic material which could not completely be removed were present and a practically good result was not gained.

[Verification of Influences of Metal Contamination on a Polyphenylene Ether]

As described before, the (PPE-1) was a polyphenylene ether obtained by using a polymerization tank having an iron-made sparger on the polymerization tank bottom; and the (PPE-3) was a polyphenylene ether obtained by using a polymerization tank having a glass-made sparger to introduce an oxygen-containing gas on the polymerization tank bottom.

As a result of each metal analysis, the content of an Fe element of the (PPE-1) was 520 ppb; and that of the (PPE-3) was 0 ppb.

In order to support evidence of contamination with a tiny amount of metals containing an Fe element as a main component originated from structures constituting plants and the like due to piping corrosion, wear and the like, the following steel ball as an iron powder was mixed in the (PPE-3), which contained no Fe element, in an amount described below.

(Steel Ball)

Steel balls made by Tanaka Co., Ltd. as described below were used.

Steel balls having passed through a sieve of 106 μm and not having passed through a sieve of 45 μm: steel ball P Steel balls having passed through a sieve of 150 μm and not having passed through a sieve of 106 μm: steel ball Q Steel balls having passed through a sieve of 250 μm and not having passed through a sieve of 150 μm: steel ball R Comparative Example 6

10 kg of the (PPE-3) and 0.050 g of the steel balls P having a particle diameter of 45 to 106 μm were mixed, and the mixture was checked for black foreign matters as it was without the separation operation by the magnetic separating machine. The evaluation result is shown in Table 2.

Comparative Example 7

10 kg of the (PPE-3) and 0.050 g of the steel balls Q having a particle diameter of 106 to 150 μm were mixed, and the mixture was checked for black foreign matters as it was without the separation operation by the magnetic separating machine. The evaluation result is shown in Table 2.

Comparative Example 8

10 kg of the (PPE-3) and 0.050 g of the steel balls R having a particle diameter of 150 to 250 μm were mixed, and the mixture was checked for black foreign matters as it was without the separation operation by the magnetic separating machine. The evaluation result is shown in Table 2.

Example 8

10 kg of the (PPE-3) and 0.050 g of the steel balls Q having a particle diameter of 106 to 150 μm were mixed, and subjected to the separation operation using the electromagnetic separating machine equipped with the screen A. The magnetic flux density was 1.6 T, and the mixture was passed at a rate of the treatment of about 200 kg/h. There was no occurrence of clogging of the screen, and the treatment could be consistently stably carried out. The evaluation result is shown in Table 2.

Examples 9 to 13

The operation was carried out as in Example 8, except for according to conditions shown in Table 2 shown below. The evaluation results are shown in Table 2.

Comparative Example 9

10 kg of the (PPE-3) and 0.050 g of the steel balls R having a particle diameter of 150 to 250 μm were mixed, and charged in a polyethylene-made bag. Thereafter, an adsorption bar T, in which a bar magnet having a magnetic flux density of 1.25

T and a diameter of 23.5 mm was put in a SUS316-made tube having an outer diameter of 25 mm, was put in the polyethylene bag, and the bag was hand blended for 1 min.

Thereafter, after the adsorption bar T was taken out from the polyethylene bag, the polyphenylene ether was checked for black foreign matters. The evaluation result is shown in Table 2.

Comparative Example 10

The operation was carried out as in Comparative Example 9, except for using the steel ball P. The evaluation result is shown in Table 2.

Comparative Example 11

10 kg of the (PPE-3) and 0.050 g of the steel balls Q having a particle diameter of 106 to 150 μm were mixed, and melt kneaded using a ZSK25 twin-screw extruder (made by Werner & Pfleiderer GmbH in Germany, number of barrels: 10, and a screw pattern having a screw diameter of 25 mm, and one kneading disc L, one kneading disc R and two kneading discs N) at a barrel set temperature of 310° C. and at a screw rotation frequency of 200 rpm, to manufacture strands at a discharge amount of 10 kg/h.

Since clogging of the screen occurred when the pellet was passed at a rate of 200 kg/h, the passing rate was inevitably suppressed. The content of the metal magnetic material of the polyphenylene ether obtained was 3.090 ppm. The evaluation result is shown in Table 2.

Example 14

As described before, the (PPE-1) was a polyphenylene ether obtained by using a polymerization tank having an iron-made sparger on the polymerization tank bottom, and the content of an Fe element by the metal analysis was 520 ppb.

A separation operation was carried out on the (PPE-1) using the electromagnetic separating machine equipped with the screen A.

The magnetic flux density was 1.6 T, and the (PPE-1) was passed at a rate of about 200 kg/h.

There was no occurrence of clogging of the screen, and the treatment could be consistently stably carried out. The content of an Fe element of the polyphenylene ether obtained was 2 ppb. The polyphenylene ether obtained was checked for black foreign matters by the method described above, and no black foreign matters were observed.

TABLE 2

|  |  | Comparative Example 6 | Comparative Example 7 | Comparative Example 8 | Example 8 | Example 9 | Example 10 | Example 11 | Example 12 | Example 13 | Comparative Example 9 | Comparative Example 10 | Comparative Example 11 | Example 14 |
|---|---|---|---|---|---|---|---|---|---|---|---|---|---|---|
| Screen Shape |  | — | — | — | A | A | A | A | A | B | — | — | — | A |
| Magnetic Force | T (tesla) | — | — | — | 1.6 | 1.2 | 1.6 | 1.2 | 1.6 | 1.2 | — | — | — | 1.6 |
| Steel Ball Mixing Amount | ppm | 5.0 | 5.0 | 5.0 | 5.0 | 5.0 | 5.0 | 5.0 | 5.0 | 5.0 | 5.0 | 5.0 | 5.0 | (No steel ball contamination, Fe: 520 ppb) |
| Treatment Amount Steel Ball | kg | 10 | 10 | 10 | 10 | 10 | 10 | 10 | 10 | 10 | 10 | 10 | 10 | 10 |
| Particle Diameter | μm | 106~150 | 45~106 | 150~250 | 106~150 | 106~150 | 45~106 | 45~106 | 150~250 | 150~250 | 150~250 | 45~106 | 106~150 |  |
| Mixing Amount | g | 0.050 | 0.050 | 0.050 | 0.050 | 0.050 | 0.050 | 0.050 | 0.050 | 0.050 | 0.050 | 0.050 | 0.050 |  |
| Treatment Rate | kg/h | — | — | — | 200 | 200 | 200 | 200 | 200 | 200 | — | — | — | 200 |
| Metal Removal Ratio | % | — | — | — | 99.8 | 99.4 | 99.0 | 98.4 | 100.0 | 100.0 | 45.2 | 33.2 | 38.2 | 99.6 |
| Steel Ball Residual Amount | ppm | 5.000 | 5.000 | 5.000 | 0.010 | 0.030 | 0.050 | 0.080 | 0.000 | 0.000 | 2.740 | 3.340 | 3.090 | (Fe: 2 ppb) |
| Check for Black Foreign Matters |  | X | X | X | ◎ | ◎ | ◎ | ○ | ◎ | ◎ | X | X | X | ◎ |
| Separation Operability |  | — | — | — | ◎ | ◎ | ◎ | ◎ | ◎ | ◎ | — | — | X | ◎ |

The melt kneaded strand was immersed in a water bath, and pelletized by a strand cutter. The size of the pellets was 3 mm×3 mm.

A separation operation was carried out on the obtained pellet using the electromagnetic separating machine equipped with the screen A. The magnetic flux density was 1.6 T.

As shown in Table 2, it was found that in Examples 8 to 13 each, since the content of the metal magnetic material was lower than 1.000 ppm, the polyphenylene ether exhibited no occurrence of black foreign matters and had a high quality. The separation operation at 200 kg/h was possible, and the polyphenylene ether could be obtained wherein the metal magnetic material was efficiency recovered.

It was found that the metal separation method using a magnetic separating machine could remove the metal magnetic material particle even in Examples 12 and 13 using the steel balls R having a particle diameter of 150 to 250 μm, and was an efficient method.

In Example 14, even in the case of using a polymerization tank having metal-made portions, and using a polyphenylene ether (PPE-1) in the state containing a metal magnetic material in the polymerization stage, the metal separation method using a magnetic separating machine could effectively remove the metal magnetic material, and a high-quality polyphenylene ether was obtained.

In Comparative Examples 9 and 10, in which the metal removal was carried out by a bar magnet instead of using a magnetic separating machine, a large number of the metal magnetic material which could not completely be removed were present, and a practically good result could not be gained.

In Comparative Example 11, since the separation operation was carried out using the pellets, the screen penetration was inferior, and the separation of the metal magnetic material could not sufficiently be carried out.

INDUSTRIAL APPLICABILITY

The polyphenylene ether according to the present invention has the industrial applicability as various types of parts materials in the field of electric and electronic materials, the field of automobiles and other fields of various types of industrial materials, film materials, IC tray materials, and food package materials.

The invention claimed is:

1. A polyphenylene ether, comprising a content of a metal magnetic material of 0.001 ppm or higher and lower than 1.000 ppm.

2. The polyphenylene ether according to claim 1, wherein the polyphenylene ether comprises a content of a metal magnetic material of 0.001 ppm or higher and lower than 0.500 ppm.

3. The polyphenylene ether according to claim 1, wherein the polyphenylene ether comprises a content of a metal magnetic material of 0.001 ppm or higher and lower than 0.100 ppm.

4. The polyphenylene ether according to claim 1, wherein the metal magnetic material is a metal magnetic material comprising an Fe element.

5. The polyphenylene ether according to claim 4, wherein the polyphenylene ether comprises a content of the Fe element of 0.001 ppm or higher and lower than 0.100 ppm.

6. The polyphenylene ether according to claim 4, wherein the polyphenylene ether is a powder having a volume-average particle diameter of 3 mm or smaller.

7. The polyphenylene ether according to claim 1, wherein the polyphenylene ether is a powder having a loose apparent specific gravity of 0.4 or higher.

8. The polyphenylene ether according to claim 1, wherein the polyphenylene ether is a powder having a specific surface area of 1 $m^2$/g or larger.

9. The polyphenylene ether according to claim 1, wherein a whole metal magnetic material comprises a content of the metal magnetic material having a maximum breadth of 150 μm or larger of 0.1 particle/kg or lower.

10. The polyphenylene ether according to claim 1, wherein the polyphenylene ether has a C. I. heat (a color index value of a polyphenylene ether compressed at 310° C. for 20 min at a pressure of 10 MPa) of 3.5 or lower.

11. A method for producing a polyphenylene ether, comprising the steps of:
polymerizing a phenol compound so as to obtain a polyphenylene ether represented by the following formula (1); and
passing the polyphenylene ether through a magnetic separating machine equipped with a magnetic force-generating source so as to make a content of a metal magnetic material in the polyphenylene ether to be 0.001 ppm or higher and lower than 1.000 ppm:

[Formula 1]

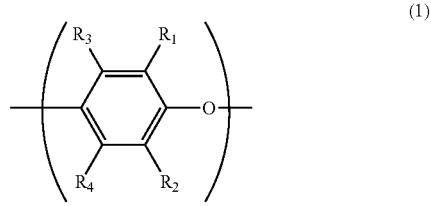

wherein $R_1$, $R_2$, $R_3$ and $R_4$ each independently represents one selected from the group consisting of a hydrogen atom, a halogen atom, an alkyl group which may be substituted, an aryl group which may be substituted, an aralkyl group which may be substituted, and an alkoxy group which may be substituted.

12. The method for producing the polyphenylene ether according to claim 11, comprising:
passing the polyphenylene ether through a magnetic separating machine equipped with a magnetic force-generating source so as to make a content of a metal magnetic material in the polyphenylene ether to be 0.001 ppm or higher and lower than 0.500 ppm.

13. The method for producing the polyphenylene ether according to claim 11, comprising:
passing the polyphenylene ether through a magnetic separating machine equipped with a magnetic force-generating source so as to make a content of a metal magnetic material in the polyphenylene ether to be 0.001 ppm or higher and lower than 0.100 ppm.

14. The method for producing the polyphenylene ether according to claim 11, wherein the metal magnetic material is a metal magnetic material comprising an Fe element.

15. The method for producing the polyphenylene ether according to claim 14, wherein the polyphenylene ether is a powder having a volume-average particle diameter of 3 mm or smaller.

16. The method for producing the polyphenylene ether according to claim 11, wherein the polyphenylene ether is a powder having a loose apparent specific gravity of 0.4 or higher.

17. The method for producing the polyphenylene ether according to claim 11, wherein the polyphenylene ether is a powder having a specific surface area of 1 $m^2$/g or larger.

18. The method for producing the polyphenylene ether according to claim 11, wherein when the polyphenylene ether is passed through the magnetic separating machine equipped with the magnetic force-generating source, a magnetic force in a region for removing a metal magnetic material from the polyphenylene ether is 0.6 T or higher.

19. The method for producing the polyphenylene ether according to claim 11, wherein the magnetic force-generating source of the magnetic separating machine is an electromagnet.

20. The method for producing the polyphenylene ether according to claim 11, wherein the polyphenylene ether is passed through between the magnetic force-generating source arranged with a spacing of 15 mm or smaller.

21. The method for producing the polyphenylene ether according to claim 11, wherein the magnetic separating machine has a magnetic force-effective separation length of 100 mm or longer.

22. The polyphenylene ether according to claim 2, wherein the metal magnetic material is a metal magnetic material comprising an Fe element.

23. The polyphenylene ether according to claim 3, wherein the metal magnetic material is a metal magnetic material comprising an Fe element.

24. The polyphenylene ether according to claim 22, wherein the polyphenylene ether comprises a content of the Fe element of 0.001 ppm or higher and lower than 0.100 ppm.

25. The polyphenylene ether according to claim 23, wherein the polyphenylene ether comprises a content of the Fe element of 0.001 ppm or higher and lower than 0.100 ppm.

26. The polyphenylene ether according to claim 22, wherein the polyphenylene ether is a powder having a volume-average particle diameter of 3 mm or smaller.

27. The polyphenylene ether according to claim 23, wherein the polyphenylene ether is a powder having a volume-average particle diameter of 3 mm or smaller.

28. The polyphenylene ether according to claim 2, wherein the polyphenylene ether is a powder having a loose apparent specific gravity of 0.4 or higher.

29. The polyphenylene ether according to claim 3, wherein the polyphenylene ether is a powder having a loose apparent specific gravity of 0.4 or higher.

30. The polyphenylene ether according to claim 2, wherein the polyphenylene ether is a powder having a specific surface area of 1 $m^2/g$ or larger.

31. The polyphenylene ether according to claim 3, wherein the polyphenylene ether is a powder having a specific surface area of 1 $m^2/g$ or larger.

32. The polyphenylene ether according to claim 2, wherein a whole metal magnetic material comprises a content of the metal magnetic material having a maximum breadth of 150 μm or larger of 0.1 particle/kg or lower.

33. The polyphenylene ether according to claim 3, wherein a whole metal magnetic material comprises a content of the metal magnetic material having a maximum breadth of 150 μm or larger of 0.1 particle/kg or lower.

34. The polyphenylene ether according to claim 2, wherein the polyphenylene ether has a C. I. heat (a color index value of a polyphenylene ether compressed at 310° C. for 20 min at a pressure of 10 MPa) of 3.5 or lower.

35. The polyphenylene ether according to claim 3, wherein the polyphenylene ether has a C. I. heat (a color index value of a polyphenylene ether compressed at 310° C. for 20 min at a pressure of 10 MPa) of 3.5 or lower.

36. The method for producing the polyphenylene ether according to claim 12, wherein the metal magnetic material is a metal magnetic material comprising an Fe element.

37. The method for producing the polyphenylene ether according to claim 13, wherein the metal magnetic material is a metal magnetic material comprising an Fe element.

38. The method for producing the polyphenylene ether according to claim 36, wherein the polyphenylene ether is a powder having a volume-average particle diameter of 3 mm or smaller.

39. The method for producing the polyphenylene ether according to claim 37, wherein the polyphenylene ether is a powder having a volume-average particle diameter of 3 mm or smaller.

40. The method for producing the polyphenylene ether according to claim 12, wherein the polyphenylene ether is a powder having a loose apparent specific gravity of 0.4 or higher.

41. The method for producing the polyphenylene ether according to claim 13, wherein the polyphenylene ether is a powder having a loose apparent specific gravity of 0.4 or higher.

42. The method for producing the polyphenylene ether according to claim 12, wherein the polyphenylene ether is a powder having a specific surface area of 1 $m^2/g$ or larger.

43. The method for producing the polyphenylene ether according to claim 13, wherein the polyphenylene ether is a powder having a specific surface area of 1 $m^2/g$ or larger.

44. The method for producing the polyphenylene ether according to claim 12, wherein when the polyphenylene ether is passed through the magnetic separating machine equipped with the magnetic force-generating source, a magnetic force in a region for removing a metal magnetic material from the polyphenylene ether is 0.6 T or higher.

45. The method for producing the polyphenylene ether according to claim 13, wherein when the polyphenylene ether is passed through the magnetic separating machine equipped with the magnetic force-generating source, a magnetic force in a region for removing a metal magnetic material from the polyphenylene ether is 0.6 T or higher.

46. The method for producing the polyphenylene ether according to claim 12, wherein the magnetic force-generating source of the magnetic separating machine is an electromagnet.

47. The method for producing the polyphenylene ether according to claim 13, wherein the magnetic force-generating source of the magnetic separating machine is an electromagnet.

48. The method for producing the polyphenylene ether according to claim 12, wherein the polyphenylene ether is passed through between the magnetic force-generating source arranged with a spacing of 15 mm or smaller.

49. The method for producing the polyphenylene ether according to claim 13, wherein the polyphenylene ether is passed through between the magnetic force-generating source arranged with a spacing of 15 mm or smaller.

50. The method for producing the polyphenylene ether according to claim 12, wherein the magnetic separating machine has a magnetic force-effective separation length of 100 mm or longer.

51. The method for producing the polyphenylene ether according to claim 13, wherein the magnetic separating machine has a magnetic force-effective separation length of 100 mm or longer.

* * * * *